(12) United States Patent
Helmsen et al.

(10) Patent No.: US 7,245,685 B2
(45) Date of Patent: Jul. 17, 2007

(54) FILTERING FOR TIMING DISTRIBUTION SYSTEM IN NETWORKING PRODUCTS

(75) Inventors: Eric J. Helmsen, Wexford, PA (US); Andrew Cassidy, Pittsburgh, PA (US); Arati Chandrasekhara, Cranberry, PA (US); Edwin George, Cranberry, PA (US)

(73) Assignee: Ericsson AB, Stockholm (SE)

( * ) Notice: Subject to any disclaimer, the term of this patent is extended or adjusted under 35 U.S.C. 154(b) by 696 days.

(21) Appl. No.: 09/730,195

(22) Filed: Dec. 5, 2000

(65) Prior Publication Data

US 2002/0095626 A1 Jul. 18, 2002

(51) Int. Cl.
*H04L 7/00* (2006.01)

(52) U.S. Cl. ............ 375/371; 375/354; 375/376; 370/516

(58) Field of Classification Search ........ 713/500–601, 713/400; 375/376, 373, 375, 371, 356, 274, 375/354; 331/17, 27, 23, 2, 18, 78, 25, 16; 327/292, 295, 156, 147, 2, 7, 12; 370/516, 370/503, 219; 364/487; 455/307; 329/325
See application file for complete search history.

(56) References Cited

U.S. PATENT DOCUMENTS

| 5,162,746 | A | * | 11/1992 | Ghoshal | 327/159 |
| 5,740,211 | A | * | 4/1998 | Bedrosian | 375/371 |
| 5,742,208 | A | * | 4/1998 | Blazo | 331/23 |
| 5,754,607 | A | * | 5/1998 | Powell et al. | 375/373 |
| 5,757,652 | A | * | 5/1998 | Blazo et al. | 702/69 |
| 5,956,379 | A | * | 9/1999 | Tarleton | 375/376 |
| 6,075,387 | A | * | 6/2000 | Urbansky | 327/2 |
| 6,078,595 | A | * | 6/2000 | Jones et al. | 370/503 |

(Continued)

FOREIGN PATENT DOCUMENTS

WO  WO 00/18008  * 3/2000

OTHER PUBLICATIONS

A novel slave-clock implementation approach for telecommunications network synchronisation□□Urbansky, R.; Sturm, W.;□□European Frequency and Time Forum, 1996. EFTF 96., Tenth (IEE Conf. Publ. 418) , Mar. 5-7, 1996 □□pp. 534-539.*

Dual-loop DPLL gear-shifting algorithm for fast synchronization Beomsup Kim; Circuits and Systems II: Analog and Digital Signal Processing, IEEE Transactions on [see also Circuits and Systems II: Express].*

Performance aspects of reference clock distribution for evolving digital networks Kihara, M.; Communications Magazine, IEEE , vol. 27 , Issue: 4 , Apr. 1989.*

(Continued)

*Primary Examiner*—Temesghen Ghebretinsae
(74) *Attorney, Agent, or Firm*—Ansel M. Schwartz (57) ABSTRACT

A timing distribution apparatus. The apparatus includes a source for producing a signal. The apparatus includes a first filter for removing jitter from the signal. The apparatus includes a second filter for removing wander from the signal separate and apart from the first filter. A method for producing a timing distribution signal. The method includes the steps of removing jitter from a signal with a first filter. Then there is the step of removing wander from the signal with a second filter separate and apart from the first filter.

17 Claims, 6 Drawing Sheets

U.S. PATENT DOCUMENTS

| | | | |
|---|---|---|---|
| 6,107,855 A * | 8/2000 | Wilcox .................... 327/295 |
| 6,144,261 A * | 11/2000 | Goto et al. ................ 331/17 |
| 6,198,353 B1 * | 3/2001 | Janesch et al. ............ 331/16 |
| 6,246,738 B1 * | 6/2001 | Acimovic et al. ..... 375/240.03 |
| 6,333,678 B1 * | 12/2001 | Brown et al. .............. 331/2 |
| 6,341,149 B1 * | 1/2002 | Bertacchini et al. ........ 375/356 |
| 6,732,286 B1 * | 5/2004 | Sutardja ................... 713/400 |
| 2003/0063701 A1 * | 4/2003 | Eubanks ................... 375/376 |

OTHER PUBLICATIONS

Synchronization of transmission systems; Holborow, C.E.; Mediavilla, R.; Communications, 1988. ICC 88. Digital Technology—Spanning the Universe. Conference Record. IEEE International Conference on; Jun. 12-15, 1988 pp. 895-898 vol. 2.*

* cited by examiner

FILTERING FOR TIMING DISTRIBUTION SYSTEM IN NETWORKING PRODUCTS

FIELD OF THE INVENTION

The present invention is related to a timing distribution system for a network-switching product. More specifically, the present invention is related to a timing distribution system for a network-switching product that removes jitter with a first filter and removes wander with a second filter.

BACKGROUND OF THE INVENTION

The present invention is related to a timing distribution system has been developed for a network-switching product that corrects several non-compliant features from previous systems. The limitations that have been addressed are:
1) Being able to successfully accept a wide range of wandering and jittering inputs that produce the same output when filtered.
2) Having a range of inputs accepted that may actually be outside of the acceptable range for a timing distribution system.
3) Being unable to monitor the frequency of a standby reference signal in order to approve it prior to the failure of a master reference signal.
4) Being unable to monitor the frequency of a standby reference signal in order to provide revertive switching to a previously failed signal.
5) Having no phase discontinuity when switching over to a standby hardware system.
6) Not having any phase discontinuity whatsoever when failing between any like frequency reference.

This system is believed to be the first of its kind that completely meets all of the industry specifications for timing distribution systems in a network-switching product (Bellcore GR-1244-CORE and GR-253-CORE, Chapter 5, both of which are incorporated by reference herein).

SUMMARY OF THE INVENTION

The present invention pertains to a timing distribution apparatus. The apparatus comprises a source for producing a signal. The apparatus comprises a first filter for removing jitter from the signal. The apparatus comprises a second filter for removing wander from the signal separate and apart from the first filter.

The present invention pertains to a method for producing a timing distribution signal. The method comprises the steps of removing jitter from a signal with a first filter. Then there is the step of removing wander from the signal with a second filter separate and apart from the first filter.

The present invention pertains to a timing distribution apparatus. The apparatus comprises a master hardware system and a backup hardware system for the master hardware system that allows the master hardware system to fail without any phase discontinuity. Each hardware system comprises a first filter for removing jitter from the signal. There is a second filter for removing wander from the signal separate and apart from the first filter. The master hardware system has a first master signal and a second master signal that are sent to the back up hardware system that informs the backup hardware system that the master hardware system is a master over the backup hardware system and, it is either in a failed or non-failed condition, respectively. The master hardware system produces a timing distribution signal that is sent to the backup hardware system which the backup hardware system uses as a reference signal for the backup hardware system but the backup hardware system does not transmit any timing distribution signal if it is not the master. When the master hardware system enters a failed condition, the backup hardware system immediately becomes the master and the backup hardware system continues to transmit the timing distribution signal that the master hardware system was producing before it failed with the timing distribution signal from the backup hardware system aligned with the timing distribution signal produced by the master hardware system before it failed so there is no phase discontinuity.

The present invention pertains to a method for producing a timing distribution signal. The method comprises the steps of producing the timing distribution signal, a first master signal and a second master signal with a master hardware system. Then there is the step of receiving the first master signal, second master signal and timing distribution signal at a backup hardware system which informs the backup hardware system that the master hardware system is a master over the backup hardware system, it is in either a failed or non-failed condition, and which the back up hardware system uses as a reference signal but the backup hardware system does not transmit any timing distribution signal if it is not the master, respectively. Next there is the step of entering the master hardware system in a failed condition. Then there is the step of having the backup hardware system immediately becoming the master and continuing to transmit the timing distribution signal that the master hardware system was transmitting before the master hardware system failed and stopped transmitting its timing distribution signal, with the timing distribution signal from the backup hardware system aligned with the timing distribution signal provided by the master hardware system before it failed so there is no phase discontinuity when the backup hardware system becomes the master and begins transmitting the timing distribution signal.

BRIEF DESCRIPTION OF THE DRAWINGS

In the accompanying drawings, the preferred embodiment of the invention and preferred methods of practicing the invention are illustrated in which.

DETAILED DESCRIPTION

Figure 1:
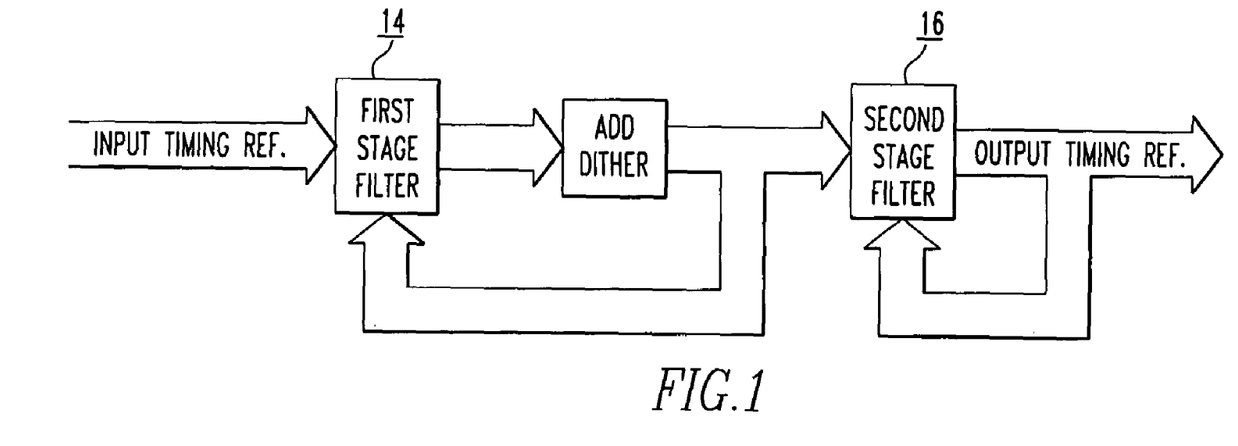
FIG. 1 is a schematic representation of the system of the present invention.
Figure 6:
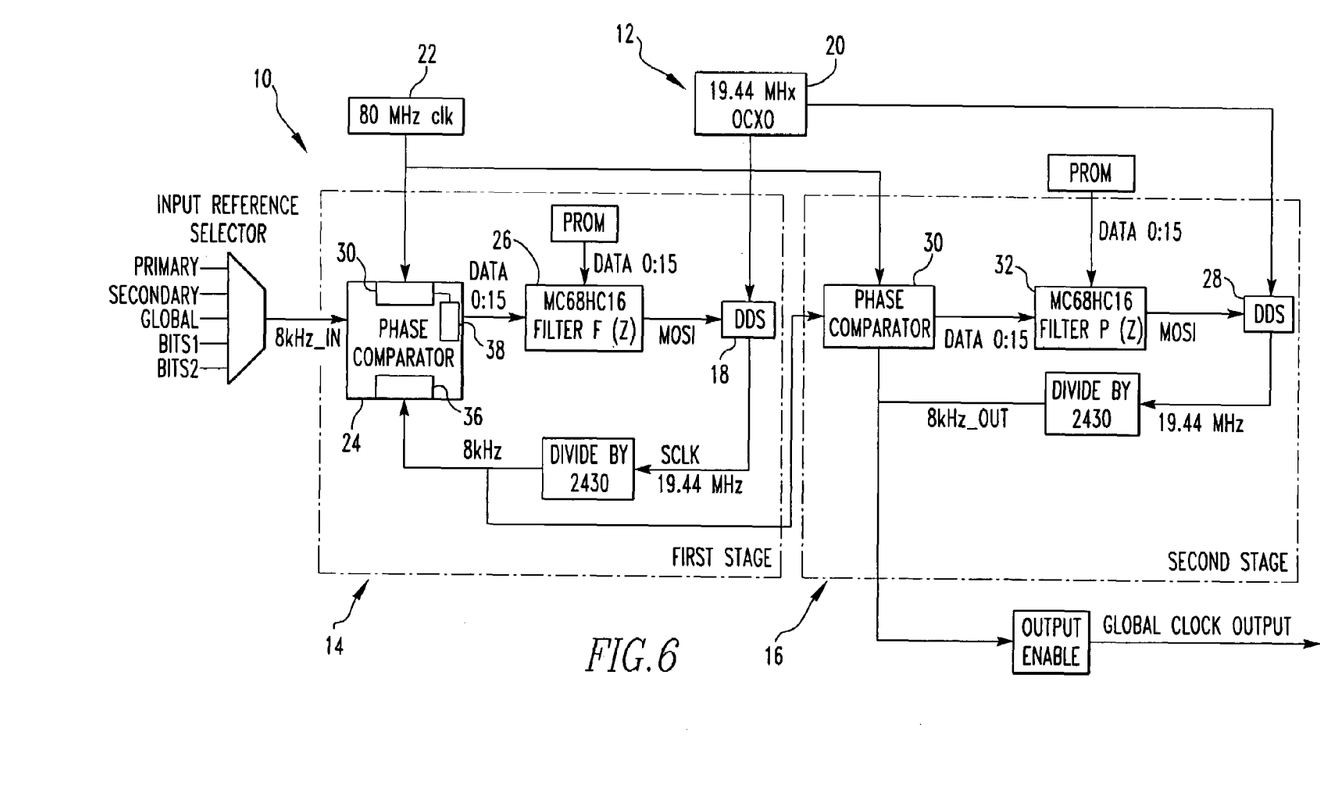
FIG. 6 is a schematic representation of the system of the present invention.

Referring now to the drawings wherein like reference numerals refer to similar or identical parts throughout the several views, and more specifically to FIGS. 1 and 6 thereof, there is shown a timing distribution apparatus 10. The apparatus 10 comprises a source 12 for producing a signal. The apparatus 10 comprises a first filter 14 for removing jitter from the signal. The apparatus 10 comprises a second filter 16 for removing wander from the signal separate and apart from the first filter 14.

Preferably, the first filter 14 includes a first tuneable directed digital synthesizer 18 connected to the source 12 for producing a clock signal derived from the signal from the source 12. The source 12 preferably includes an oscillator 20 that produces the signal. Preferably, the first filter 14 includes a reference input clock signal mechanism 22 for providing a reference input clock signal with respect to the clock signal.

The first filter 14 preferably includes a first comparison mechanism 24 which accumulates error between the clock signal and a reference input clock signal and produces an error correction signal to tune the direct digital synthesizer. Preferably, the first comparison mechanism 24 includes a microcontroller which accumulates the error between the clock signal and the reference input clock signal for a predetermined number of consecutive cycles, and applies dithering to the accumulated error to produce the error correction signal.

The second filter 16 preferably includes a second tuneable directed digital synthesizer 28 connected to the first filter 14 for producing a second clock signal from the first clock signal from the first filter 14. Preferably, the second filter 16 includes a second comparison mechanism 30 which accumulates error between the first clock signal and the second clock signal and produces a second error correction signal to tune the second directed digital synthesizer. The first filter 14 preferably removes noise greater than 1 KHz from the signal and the second filter 16 removes noise less than 1 KHz from the signal.

Preferably, the second comparison mechanism 30 includes a second microcontroller 32 which accumulates the error between the first clock signal and the second clock signal for a predetermined number of consecutive cycles and computes the second error correction signal. The first comparison mechanism 24 preferably includes a first counter 34 which receives the reference input signal and counts a second predetermined number of cycles between rising edges of the reference input clock signal. There is a second counter 36 which receives the clock signal and counts the second predetermined number of cycles between rising edges of the clock signal. There is a comparator 38 which compares the counts of the first and second counters 34, 36 and reports differences in the counts every predetermined period to the first microcontroller 26.

Preferably, the reference input clock signal and the clock signal have a frequency of about 8 KHz, the second predetermined number of cycles is 80 MHz, the predetermined period where the comparator 38 reports differences in the counts to the first microcontroller 26 is about 125 microseconds, and the predetermined number of cycles is 1024. The accumulated error preferably includes a scaled error, and the first microcontroller 26 determines scaled error according to $$ScaledError = K_i * error[n] + K_a * \sum_{i=1}^{n} error[i],$$

where $K_i$ is a coefficient for scaling the instantaneous error and $K_a$ is a coefficient.

Preferably, the first filter 14 and the second filter 16 have an acceptable range of inputs that they will accept in regard to the signal from the source 12, which are outside of a predetermined acceptable range. The signal preferably has a nominal frequency and the acceptable range is +/−4.6 ppm away from the nominal frequency.

The present invention pertains to a method for producing a timing distribution signal. The method comprises the steps of removing jitter from a signal with a first filter 14. Then there is the step of removing wander from the signal with a second filter 16 separate and apart from the first filter 14.

Preferably, the removing the jitter step includes the step of applying an error correction signal to a direct digital synthesizer of the first filter 14 by a first microcontroller 26 of the first filter 14 based on accumulated error between a reference input clock signal and a clock signal from the direct digital synthesizer. Before the removing the jitter step, there is preferably the step of producing the clock signal from the signal from an oscillator 20. Preferably, the applying step includes the step of applying dither to the accumulated error.

The removing wander step preferably includes the step of applying a second error correction signal to a second direct digital synthesizer of the second filter 16 by a second microcontroller 32 based on accumulated error for a predetermined period of time between the clock signal and a second clock signal from the second direct digital synthesizer. Preferably, before the applying dither step of the applying step, there is the step of computing an average error value.

After the computing step of the applying step, there is preferably the step of computing a scaled error value where $$ScaledError = K_i * error[n] + K_a * \sum_{i=1}^{n} error[i],$$

where $K_i$ is a coefficient for scaling the instantaneous error and $K_a$ is a coefficient. Preferably, before the average error value computing step, there is the step of comparing counts of a first counter 34 counting a second predetermined number of cycles between rising edges of the reference input clock signal and of a second counter 36 counting the second predetermined number of cycles between rising edges of the clock signal. The removing jitter step preferably includes the step of accepting a range of inputs in regard to the signal which are outside of a predetermined acceptable range.

Figure 4:
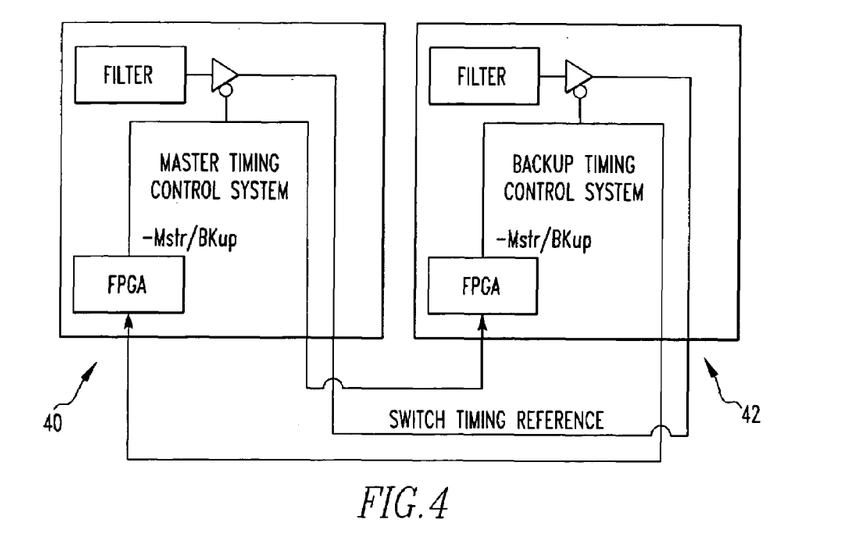
FIG. 4 is a schematic representation of the system of the present invention in regard to how the signals are connected between the master timing control hardware and the standby timing control hardware.

Referring to FIG. 4, the present invention pertains to a method for producing a timing distribution signal. The method comprises the steps of producing the timing distribution signal, a first master signal and a second master signal with a master hardware system 40. Then there is the step of receiving the first master signal, second master signal and timing distribution signal at a back up hardware system which informs the backup hardware system 42 that the master hardware system 40 is a master over the backup hardware system 42, it is in either a failed or non-failed condition, and which the back up hardware system uses as a reference signal but the backup hardware system 42 does not transmit any timing distribution signal if it is not the master, respectively. Next there is the step of entering the master hardware system 40 in a failed condition. Then there is the step of having the backup hardware system 42 immediately becoming the master and continuing to transmit the timing distribution signal that the master hardware system 40 was transmitting before the master hardware system 40 failed and stopped transmitting its timing distribution signal, with the timing distribution signal from the backup hardware system 42 aligned with the timing distribution signal provided by the master hardware system 40 before it failed so there is no phase discontinuity when the backup hardware system 42 becomes the master and begins transmitting the timing distribution signal.

The present invention pertains to a timing distribution apparatus 10. The apparatus 10 comprises a master hardware system 40 and a backup hardware system 42 for the master hardware system 40 that allows the master hardware system 40 to fail without any phase discontinuity. Each hardware system comprises a first filter 14 for removing jitter from the signal. There is a second filter 16 for removing wander from the signal separate and apart from the first filter 14, as described above. The master hardware system 40 has a first master signal and a second master signal that are sent to the back up hardware system that informs the backup hardware system 42 that the master hardware system 40 is a master over the backup hardware system 42 and, it is either in a failed or non-failed condition, respectively. The master hardware system 40 produces a timing distribution signal that is sent to the backup hardware system 42 which the backup hardware system 42 uses as a reference signal for the backup hardware system 42 but the backup hardware system 42 does not transmit any timing distribution signal if it is not the master. When the master hardware system 40 enters a failed condition, the backup hardware system 42 immediately becomes the master and the backup hardware system 42 continues to transmit the timing distribution signal that the master hardware system 40 was producing before it failed with the timing distribution signal from the backup hardware system 42 aligned with the timing distribution signal produced by the master hardware system 40 before it failed so there is no phase discontinuity.

In the operation of the invention, the system allows a wide range of both jittering and wandering inputs to be used as the source 12 for the timing distribution system. By using two stages of filtering on a timing reference input, a high-quality output-timing signal can be generated and distributed to the transmission elements in the network switch. Previous practice would have used a single stage of filtering in order to attempt to achieve the same goal, but this proved to be insufficient for this application. Another possible solution would have been to use a jitter attenuation circuit in a Line Interface Unit (LIU). However, the jitter attenuation circuit in the LIU had temperature sensitivity and was, therefore, deemed insufficient for this application. By using two-stage filtering, the responsibilities of the filters are able to be subdivided so that the first stage filter can reduce the input jitter and add dithering. The dithering allows the second stage to more closely lock to the output of the first stage in the case that the input signal does not have any wander. The lower frequency filter in the second stage can be used to knock out the wander in the input reference. The filtering function is shown in FIG. 1.

The two filters have a similar implementation but with different coefficients used to control the strength of the filter. The first-stage filter accumulates error between the reference input clock signal and a tunable direct digital synthesizer (DDS) clock signal derived from a high precision oven controlled oscillator (OCXO). Both of these input signals, which have a frequency of 8 kHz, are inputs to a separate counter. The counters track the number of 80 MHz cycles between the rising-edges of each of the input signals. A comparison is made, and the difference is reported every 125 microseconds to the microcontroller that controls the filter. The microcontroller accumulates this error for 1024 consecutive cycles (approximately 1 second) before computing an average error value for the time slice. This average error value is used to compute a scaled error value in the formula below. Before a new value is written to tune the DDS, dither is added to the signal. This dithering either adds or subtracts 12.5 nanoseconds of phase from the signal in order to make it easier for the second stage to detect error in its input signal. Since the dither is added in one write to the DDS and subtracted in the next, there is no accumulative error added to the filtered signal.

The second stage receives an 8 kHz signal from the first stage and an 8 kHz signal from a second DDS. As in the first stage, error is accumulated and read by the microcontroller. This is used to compute a tuning value for the DDS. The filter that is implemented in the second stage responds to much lower frequencies than the first stage in an effort to remove wander from the signal. The filter function is of the form $$ScaledError = K_i * error[n] + K_a * \sum_{i=1}^{n} error[i],$$

where $K_i$ is a coefficient for scaling the instantaneous error and $K_a$ is a coefficient for scaling the error that is accumulated since the timing reference was chosen by the system. The coefficients for the first stage are about 3 orders of magnitude larger than the coefficients for the second stage.

The selector function provides a multiplexer to select one of six possible inputs. The choices are: the primary reference from the port cards, the secondary reference from the port cards, the global reference driven by the main TCM, one of the two BITS inputs, or the DPLL oscillator 20 output. Under normal operating conditions, the reference would be selected from the primary, secondary, or one of the two BITS inputs. The DPLL oscillator 20 output is selected when the TCM is in FreeRun or Holdover. The global reference is selected by the standby TCM in order to synchronize with the main TCM's output.

The input reference that is selected is based on the value written in the Input Select Register (Register 3). The selected clock is used as the reference for the DPLL as shown in FIG. 6, as well as for the analog PLL, which generates the transmitted BITS, clock. (For diagnostic purposes, the output of the DPLL can be selected instead as the source 12 for the transmitted BITS clock.)

Figure 2:
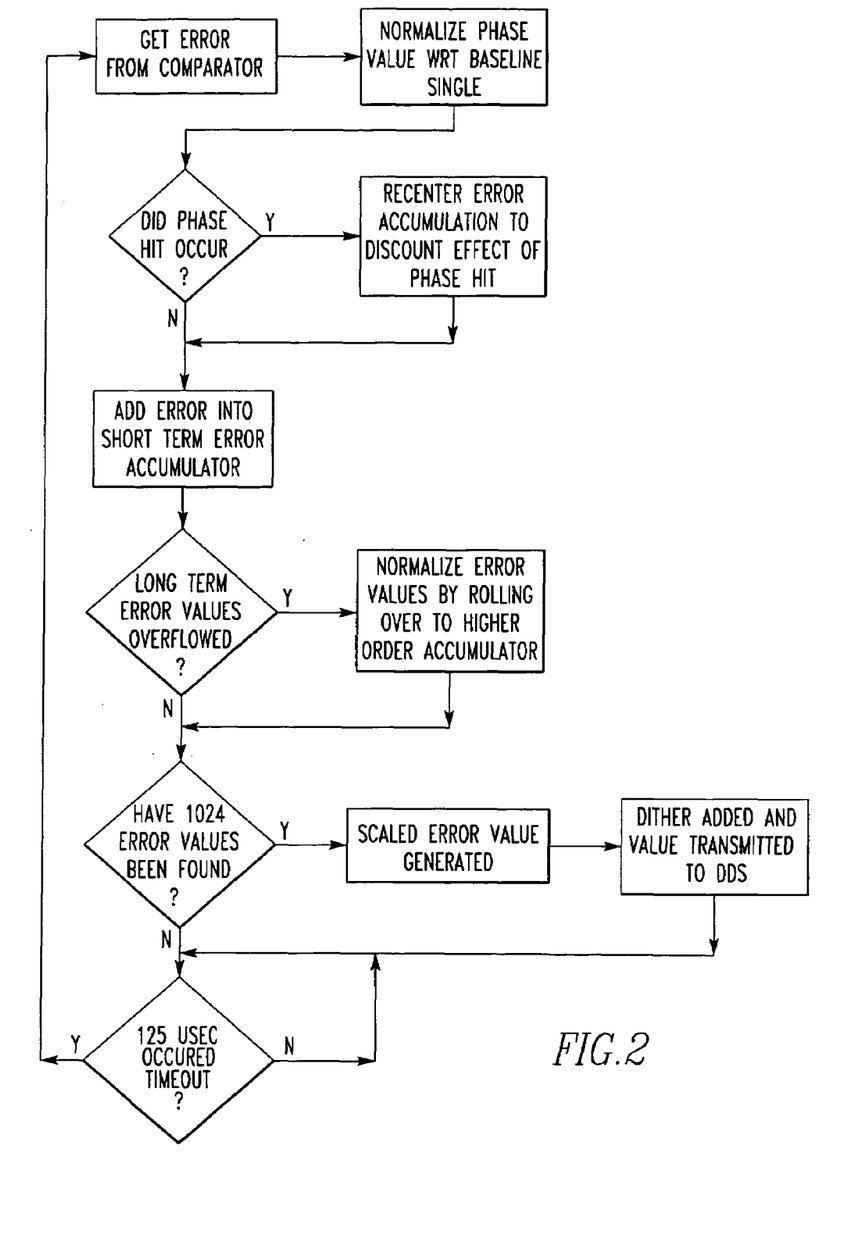
FIG. 2 is a flow chart regarding the operation of the present invention.

The digital filter function is implemented using two Motorola MC68HC16Z1 microcontrollers. The microcontrollers are responsible for qualifying the incoming clock, filtering to stabilize the clock, and for reporting the status of the current operating mode. The digital filter implements moving average and FIR filters to smooth short-term variations in phase. This is intended to reduce jitter. The digital filter implements a PID filter to correct long-term variations in phase. This is intended to reduce wander. The first microcontroller 26 (first stage) reduces jitter, while the second microcontroller 32 (second stage) reduces wander. A flow chart is shown in FIG. 2 that displays the basic operation for both stages.

Figure 3:
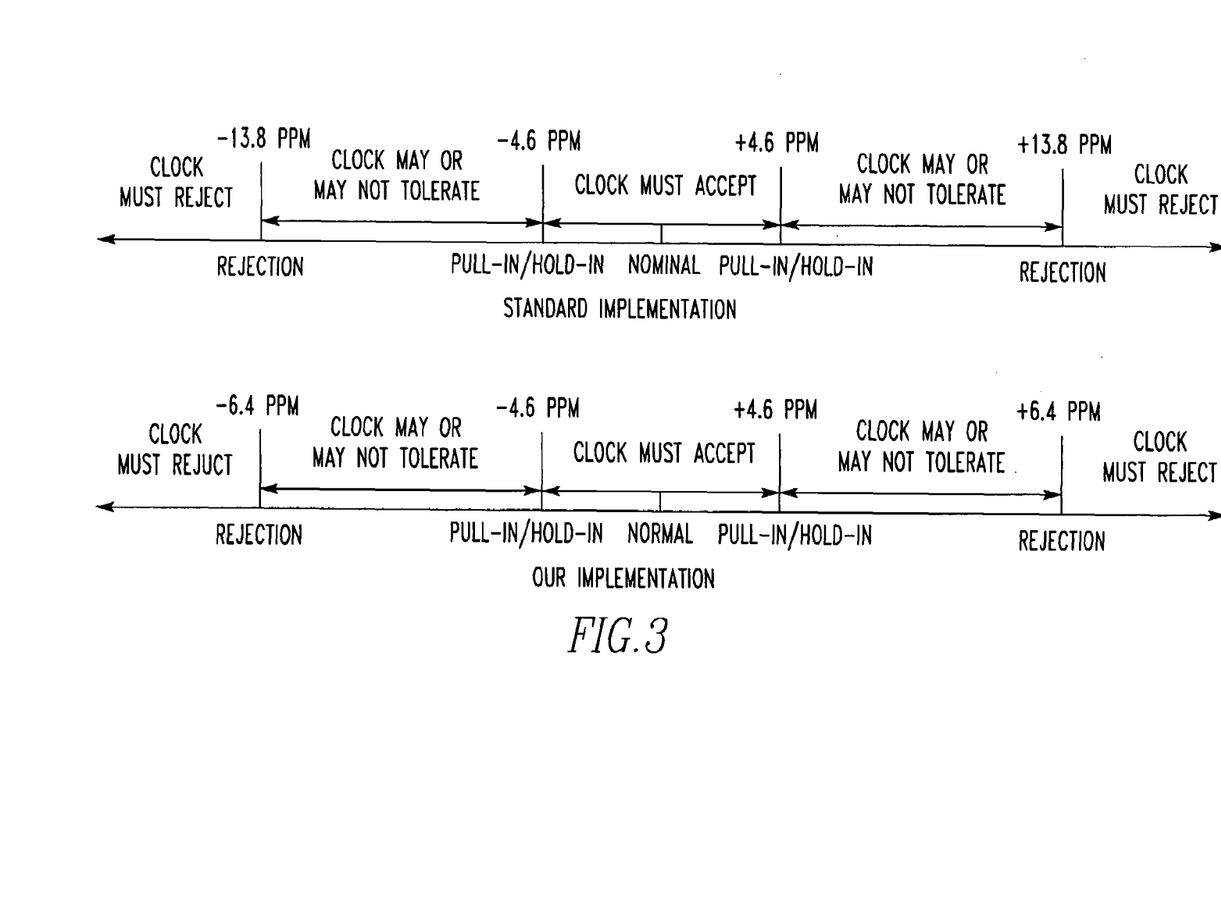
FIG. 3 is a comparison of the acceptable variance of the present invention as opposed to prior art.

The system uses a high precision OCXO as the basis for its timing qualification, which allows it to have a much tighter range when qualifying signals. Other timing distribution systems use the clock that is held over from the previous valid reference when qualifying a new reference. If the previous reference were lost because of an off frequency condition, this "holdover" clock would be several ppm off of the nominal frequency. Since this clock is used as the basis for qualifying new references, the window for acceptance has to be much larger than the actually acceptable range for the new reference from the nominal frequency. If the acceptable variance in a reference source 12 were +/−4.6 ppm, then the range for the old system would have to be at least four times as wide in order to accommodate the case where the holdover value is +4.6 ppm and the new reference is −4.6 ppm away from the nominal frequency and the opposite case. Further, this can cause the timing distribution system to attempt to lock to a signal that is not valid since a signal that is +9 ppm off nominal would be considered valid if the holdover value is +4.6 ppm off nominal. This is shown in FIG. 3.

In the system, the comparison point is always centered within the tolerance of the OCXO. By using a free running oscillator 20 as the comparison source 12, it is possible to tighten the range over which a new reference is validated. This range is equal to the range specified by the specification (+/−4.6 ppm) plus the variance inherent in the OCXO (+/−1.2 ppm) plus some margin for error. Having a tighter range with a stable center point means that there will be no instances in which the reference would be initially qualified and then rejected after it has passed its initial qualification unless the reference source 12 subsequently drifts away from the nominal frequency. This provides improved performance in the system and allows for fewer transitions between references, which in turn provides for a more stable system. Most importantly, the system is able to recover from off frequency conditions without the need for human intervention, which would be necessary for systems which base their comparison on the holdover value.

The system provides a means by which the frequency of the standby reference signal is monitored prior to a failure of the master reference signal. In previous solutions, the standby signal was merely checked for alarm conditions such as loss of signal, loss of frame, etc. without any comparison of the frequency being made. In systems where the frequency was compared, it was compared to the holdover value of the system, which means that it could be significantly off frequency such that an invalid signal could be considered valid (see argument made in part 2). By using the free running value of the local oscillator 20, it is possible to independently monitor the standby frequency prior to it being qualified on a failure of the primary reference. This provides the advantage of having a signal that is pre-qualified correctly, thereby preventing the system from continually changing references if an invalid reference became the primary reference signal. The implementation is similar to the implementation of the first stage filter of the active reference described in part 1, the difference being that no attempt is made to actually lock to the standby reference or to tune the DDS. The signal is merely monitored for frequency validity.

The system allows for revertive switching to occur in the system. Given that there is a primary reference and a standby reference in a timing distribution system, revertive switching provides priority to the primary reference being the active timing reference even if it has previously failed. In the case where the primary reference fails, the standby reference becomes active. When revertive switching is enabled, the primary reference must become the active timing reference if it is ever determined that it has recovered from its failure condition and has become a valid reference source 12. The system is able to accomplish this because not only are the alarm conditions of the non-active reference are monitored at all times, but also the frequency of the non-active reference is monitored at all times. A change in state from failed to valid is recognized and communicated to the system processor which initiates the revertive switch in the case that the primary reference signal has recovered. Previous systems were not able to properly implement revertive switching since they were not able to monitor the frequency of the non-active reference properly. The implementation is the same as described above.

The system allows a failure without any phase discontinuity in the case that the master hardware system 40 incurs a failure and an identical backup hardware system 42 is installed. The master hardware system 40 has two signals that tell the backup that it is the master and that it is in a non-failed condition, respectively. If the master enters a failed condition, the backup hardware system 42 immediately becomes the master and continues to transmit the clock that the previous master was distributing to the network. It is able to do this by using the clock being transmitted by the master as the reference source 12 for the backup hardware system 42. Even though the backup hardware system 42 is not exporting its generated timing signal to the timing network, the reference is still being generated so that it can be immediately available in the event that the master hardware system 40 fails. Additionally, the phase relationship between the timing reference from the master hardware system 40 and the generated timing signal are aligned in order to ensure that there is no phase discontinuity from when the master system fails and stops transmitting its generated timing signal to when the backup hardware system 42 takes over and starts transmitting its generated timing reference. FIG. 4 shows how the signals are connected between the two hardware systems.

Figure 5:
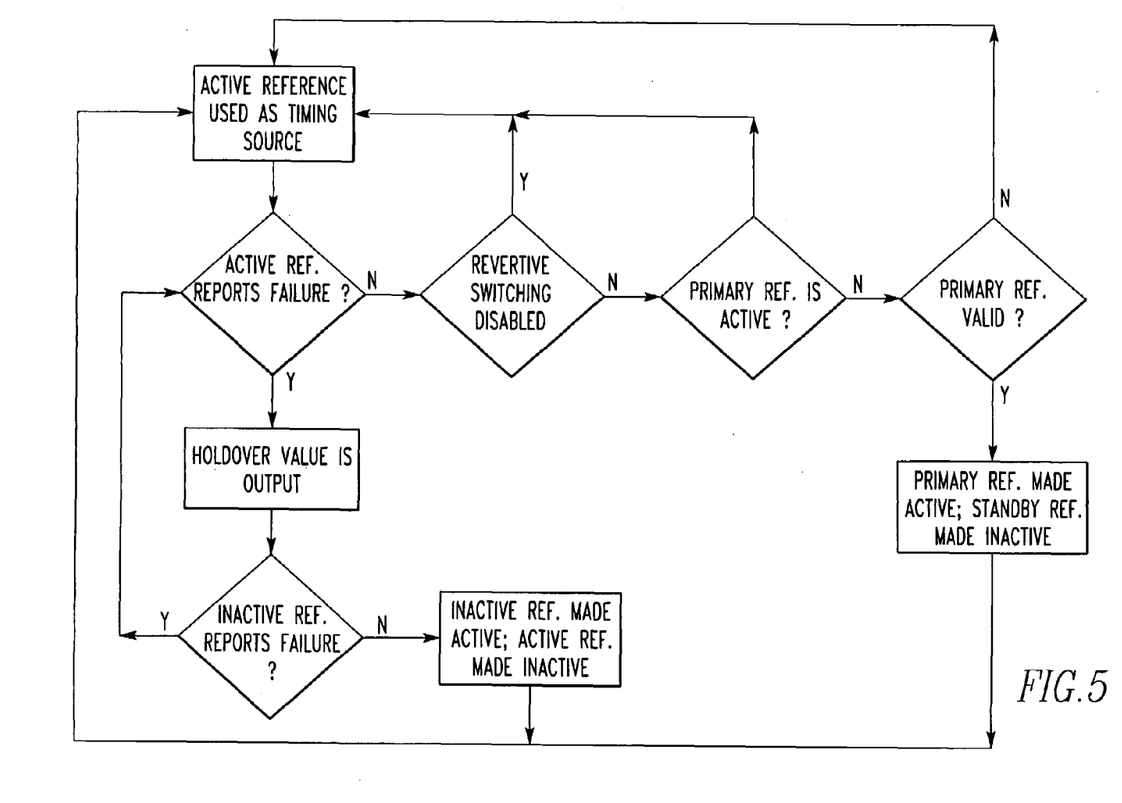
FIG. 5 is a flow chart showing the steps involved in the transfer from the active to the standby reference.

The system provides switching between references of like frequency without incurring any phase discontinuities in the output signal. This is accomplished by momentarily holding the generated timing reference at a 'holdover' value while the new reference is being accepted as the active timing reference. Since the holdover value is known to be within tolerance, the value can be used for the short period of time that is necessary for the standby reference to be qualified as the active. By going to the holdover value, any phase discontinuities are able to be bypassed that would otherwise occur if one were to directly transfer from the active to the standby reference. The flow chart in FIG. 5 shows the steps involved in the transfer. It also shows the process for implementing revertive switching.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A timing distribution apparatus comprising:
   a source for producing a signal, the source includes an oscillator that produces the signal;
   a first filter for removing jitter from the signal, the first filter includes a first tuneable directed digital synthesizer connected to the source for producing a first clock signal derived from the signal from the source, the first filter includes a reference input clock signal mechanism for providing a reference input clock signal with respect to the first clock signal, the first filter includes a first comparison mechanism which accumulates error between the first clock signal and a reference input clock signal and produces an error correction signal to tune the directed digital synthesizer, the first comparison mechanism includes a microcontroller which accumulates the error between the first clock signal and the reference input clock signal for a predetermined number of consecutive cycles, and applies dithering to the accumulated error to produce the error correction signal; and a second filter for removing wander from the signal separate and apart from the first filter.

2. An apparatus as described in claim 1 wherein the second filter includes a second tuneable directed digital synthesizer connected to the first filter for producing a second clock signal from the first clock signal from the first filter.

3. An apparatus as described in claim 2 wherein the second filter includes a second comparison mechanism which accumulates error between the first clock signal and the second clock signal and produces a second error correction signal to tune the second directed digital synthesizer.

4. An apparatus as described in claim 3 wherein the first filter removes noise greater than 1 KHz from the signal and the second filter removes noise less than 1 KHz from the signal.

5. An apparatus as described in claim 4 wherein the second comparison mechanism includes a second microcontroller which accumulates the error between the first clock signal and the second clock signal for a predetermined number of consecutive cycles and computes the second error correction signal.

6. An apparatus as described in claim 5 wherein the first comparison mechanism includes a first counter which receives the reference input signal and counts a second predetermined number of cycles between rising edges of the reference input clock signal; a second counter which receives the clock signal and counts the second predetermined number of cycles between rising edges of the clock signal; and a comparator which compares the counts of the first and second counters and reports differences in the counts every predetermined period to the first microcontroller.

7. An apparatus as described in claim 6 wherein the reference input clock signal and the clock signal have a frequency of about 8 KHz, the second predetermined number of cycles is 80 MHz, the predetermined period where the comparator reports differences in the counts to the first microcontroller is about 125 microseconds, and the predetermined number of cycles is 1024.

8. An apparatus as described in claim 7 wherein the accumulated error includes a scaled error, and the first microcontroller determines scaled error according to $$ScaledError = K_i * error[n] + K_a * \sum_{i=1}^{n} error[i],$$

where $K_i$ is a coefficient for scaling the instantaneous error and $K_a$ is a coefficient.

9. A method for producing a timing distribution signal comprising the steps of:

removing jitter from a signal with a first filter by applying an error correction signal to a direct digital synthesizer of the first filter by a first microcontroller of the first filter based on accumulated error between a reference input clock signal and a clock signal from the direct digital synthesizer; and removing wander from the signal with a second filter separate and apart from the first filter.

10. A method as described in claim 9 wherein before the removing the jitter step, there is the step of producing the clock signal from the signal from an oscillator.

11. A method as described in claim 10 wherein the applying step includes the step of applying dither to the accumulated error.

12. A method as described in claim 11 wherein the removing wander step includes the step of applying a second error correction signal to a second direct digital synthesizer of the second filter by a second microcontroller based on accumulated error for a predetermined period of time between the clock signal and a second clock signal from the second direct digital synthesizer.

13. A method as described in claim 12 wherein before the applying dither step of the applying step, there is the step of computing an average error value.

14. A method as described in claim 13 wherein after the computing step of the applying step, there is the step of computing a scaled error value where $$ScaledError = K_i * error[n] + K_a * \sum_{i=1}^{n} error[i],$$

where $K_i$ is a coefficient for scaling the instantaneous error and $K_a$ is a coefficient.

15. A method as described in claim 14 wherein before the average error value computing step, there is the step of comparing counts of a first counter counting a second predetermined number of cycles between rising edges of the reference input clock signal and of a second counter counting the second predetermined number of cycles between rising edges of the clock signal.

16. A timing distribution apparatus comprising:

a master hardware system and a backup hardware system for the master hardware system that allows the master hardware system to fail without any phase discontinuity, each hardware system comprising: a first filter for removing jitter from the signal; and a second filter for removing wander from the signal separate and apart from the first filter; the master hardware system having a first master signal and a second master signal that are sent to the back up hardware system that informs the backup hardware system that the master hardware system is a master over the backup hardware system and, it is either in a failed or non-failed condition, respectively, the master hardware system producing a timing distribution signal that is sent to the backup hardware system which the backup hardware system uses as a reference signal for the backup hardware system but the backup hardware system does not transmit any timing distribution signal if it is not the master, wherein when the master hardware system enters a failed condition, the backup hardware system immediately becomes the master and the backup hardware system continues to transmit the timing distribution signal that the master hardware system was producing before it failed with the timing distribution signal from the backup hardware system aligned with the timing distribution signal produced by the master hardware system before it failed so there is no phase discontinuity.

17. A timing distribution apparatus comprising:

a source for producing a signal;

a first filter for removing jitter from the signal, the first filter includes a first tuneable directed digital synthesizer connected to the source for producing a clock signal derived from the signal from the source, the first filter includes a reference input clock signal mechanism for providing a reference input clock signal with respect to the clock signal, the first filter includes a microcontroller which accumulates error between the clock signal and a reference input clock signal and produces an error correction signal to tune the directed digital synthesizer, the accumulated error includes a scaled error, and the first microcontroller determines scaled error according to $$ScaledError = K_i * error[n] + K_a * \sum_{i=1}^{n} error[i],$$

where $K_i$ is a coefficient for scaling the instantaneous error and $K_a$ is a coefficient; and a second filter for removing wander from the signal separate and apart from the first filter.

* * * * *